(12) United States Patent
Paveza et al.

(10) Patent No.: US 7,487,312 B2
(45) Date of Patent: Feb. 3, 2009

(54) APPARATUS, SYSTEM, AND METHOD FOR COPY PROTECTION

(75) Inventors: John Richard Paveza, Morgan Hill, CA (US); Richard Anthony Ripberger, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 450 days.

(21) Appl. No.: 10/962,691

(22) Filed: Oct. 12, 2004

(65) Prior Publication Data

US 2006/0080516 A1    Apr. 13, 2006

(51) Int. Cl.
*G06F 12/00*    (2006.01)
(52) U.S. Cl. ................. 711/163; 711/162; 709/225; 709/216
(58) Field of Classification Search ............... 711/162, 711/163, 164, 173; 709/225, 216
See application file for complete search history.

(56) References Cited

U.S. PATENT DOCUMENTS

| 5,675,781 | A | 10/1997 | Duncan et al. ............ 395/608 |
| 6,044,444 | A | 3/2000 | Ofek ...................... 711/162 |
| 7,373,670 | B2 * | 5/2008 | Mimatsu et al. ............ 726/27 |
| 2001/0020254 | A1 * | 9/2001 | Blumenau et al. .......... 709/229 |
| 2004/0260896 | A1 * | 12/2004 | Werner et al. ............. 711/162 |
| 2005/0097271 | A1 * | 5/2005 | Davies et al. ............. 711/114 |

FOREIGN PATENT DOCUMENTS

| JP | 63-088656 | 4/1988 |
| JP | 07-281939 | 10/1995 |
| WO | WO 01/67247 | 9/2001 |

OTHER PUBLICATIONS

IBM Technical Disclosure Bulletin, vol. 32, No. 5A Oct. 1989, pp. 296-297.

* cited by examiner

*Primary Examiner*—Brian R Peugh
(74) *Attorney, Agent, or Firm*—Kunzler & McKenzie (57) ABSTRACT

An apparatus, system, and method are disclosed for facilitating copy protection. The apparatus includes a definition module, a request module, and a determination module, each coupled to a first storage sub-system. The definition module is configured to define a protection definition for a plurality of electronic storage devices of the first storage sub-system. The request module is configured to receive a copy request from a second storage sub-system. The determination module is configured to determine at the first storage sub-system a copy protection status of a destination device. The copy protection status may be indicated by the protection definition, which includes a protection indicator and may include one or more restriction indicators. The apparatus advantageously allows a user to protect a selected destination device against accidental or otherwise detrimental copying.

30 Claims, 8 Drawing Sheets

| Volume 122 | Target Volume Address 402 | Protection Bit 412 | Restricted Copy Types 422 | Restricted Source Volumes 432 |
|---|---|---|---|---|
| Volume 124 | Target Volume Address 404 | Protection Bit 414 | Restricted Copy Types 424 | Restricted Source Volumes 434 |
| Volume 126 | Target Volume Address 406 | Protection Bit 416 | Restricted Copy Types 426 | Restricted Source Volumes 436 |
| ⋮ | ⋮ | ⋮ | ⋮ | ⋮ |
| Volume 128 | Target Volume Address 408 | Protection Bit 418 | Restricted Copy Types 428 | Restricted Source Volumes 438 |

APPARATUS, SYSTEM, AND METHOD FOR COPY PROTECTION

BACKGROUND OF THE INVENTION

1. Field of the Invention

This invention relates to data copying and more particularly relates to facilitating copy protection on an electronic storage device.

2. Description of the Related Art

Data is copied for a variety of reasons. For example, a user may want to make a backup copy of data. Additionally, the user may want to move the data to make it accessible to a certain application program or network area. Different copying technologies, for example, point-in-time, synchronous continuous, asynchronous continuous, and so forth, exist in order to facilitate different copying needs.

Within a storage area network (SAN), copy functions in storage controllers allow a user to invoke a copy of one volume onto another volume. The volume from which data is copied may be referred to as the source volume. The volume onto which the copied data is written may be referred to as the destination volume or target volume. Volumes also may be discussed in terms of electronic storage devices, since a logical volume may be stored on one or more physical storage devices. When data from a source volume is copied to a target volume, the data that was previously on the target volume is overwritten by the newly copied data. When a user incorrectly specifies a target volume, valuable data on the target volume may be accidentally or unknowingly lost due to such overwriting.

Conventional copying technologies in storage sub-systems allow any volume to be selected as a target volume in a copy operation. Some exceptions apply, but they are typically limited to volumes that are in use or otherwise unavailable to participate in the copy operation. Unfortunately, accidental designation of the destination volume can cause a substantial loss of valuable data. For example, if a user means to copy data from volume A to volume B, but accidentally designates volume C as the destination volume, there may be no way to prevent the operation of copying data from volume A to volume C. As a result, the data from volume C may be lost, even though the designation of volume C as a target volume may have been incorrect and accidental.

The potential for copying mishaps using conventional techniques is complicated by the size and complexity of many SANs and storage sub-systems. A SAN system having ten storage sub-systems may have hundreds, even thousands, of volumes distributed among the storage sub-systems within the SAN system. It may be extremely difficult to track all of the illegal copying operations that may be attempted among the various storage sub-systems and volumes. Additionally, the difficulty may drastically increase as the storage sub-systems and volumes are dynamically used, replaced, and reassigned within the SAN system, thereby, requiring frequent and complicated synchronization.

From the foregoing discussion, it should be apparent that a need exists for an apparatus, system, and method to facilitate copy protection. Beneficially, such an apparatus, system, and method would allow a user to protect a selected destination device against accidental or otherwise detrimental copying. The apparatus, system, and method also may beneficially eliminate the need for a complex and centralized database to describe all of the potentially illegal copy operations that may be attempted with a SAN system.

SUMMARY OF THE INVENTION

The present invention has been developed in response to the present state of the art, and in particular, in response to the problems and needs in the art that have not yet been fully solved by currently available copy protection technologies. Accordingly, the present invention has been developed to provide an apparatus, system, and method for copy protection that overcome many or all of the above-discussed shortcomings in the art.

The apparatus to facilitate copy protection is provided with a logic unit containing a plurality of modules configured to functionally execute the relevant operations of copy protection. These modules in the described embodiments include a definition module, a request module, a determination module, a failure module, a copy module, a notification module, and an exchange module. In one embodiment, each of these modules may be coupled to a first storage sub-system within a storage area network (SAN) system.

The definition module, in one embodiment, defines a protection definition for a plurality of electronic storage devices of the first storage sub-system. The request module, in one embodiment, receives a copy request from a second storage sub-system. The second storage sub-system also may reside within the SAN system. The copy request may originate from a host coupled to the second storage sub-system. The determination module, in one embodiment, determines a copy protection status of a destination device, such as one of the plurality of electronic storage devices within the first storage sub-system. This determination may occur at the first storage sub-system.

The failure module, in one embodiment, fails the copy request in response to a determination that the copy protection status of the destination device is copy protected. Similarly, the copy module, in one embodiment, processes the copy request in response to a determination that the copy protection status of the destination device is not copy protected. The notification module, in one embodiment, notifies the second storage sub-system of the copy protection status of the destination device. The notification module also may notify the second storage sub-system of the status of the copy request and operations. The exchange module, in one embodiment, modifies the protection definition in response to an event. For example, the exchange module may replace the protection definition with an alternate protection definition in response to a recovery event.

A system is also presented to facilitate copy protection. The system may be embodied in a storage area network (SAN) system. In particular, the system, in one embodiment, includes a first storage sub-system, a second storage sub-system, and a copy apparatus. The first storage sub-system includes a first electronic storage device, which may be one of many electronic storage devices. The second storage sub-system, in one embodiment, receives a copy request from a host and sends the copy request to the first storage sub-system. The copy apparatus, in one embodiment, determines at the first storage sub-system a copy protection status of the first electronic storage device as indicated in a protection definition. Further embodiments of the system may include an electronic storage device and/or an electronic memory device to store the protection definition. Additionally, the system may include the host and a storage area network (SAN).

A method is also presented for copy protection. The method in the disclosed embodiments substantially includes operations to carry out the functions presented above with respect to the operation of the described apparatus and system. In one embodiment, the method includes defining a protection definition for a plurality of electronic storage devices of a first storage sub-system, receiving a copy request from a second storage sub-system, and determining a copy protection status of a destination device. The copy protection status may be defined within the protection definition. In a further embodiment, the destination device is one of the plurality of electronic storage devices. Additionally, the determination may occur at the first storage sub-system.

In certain embodiments, the method also may include one or more of the following operations: failing the copy request in response to a determination that the copy protection status of the destination device is copy protected; processing the copy request in response to a determination that the copy protection status of the destination device is not copy protected; notifying the second storage sub-system of the copy protection status of the destination device; modifying the protection definition in response to an event; and/or defining an alternative protection definition.

Reference throughout this specification to features, advantages, or similar language does not imply that all of the features and advantages that maybe realized with the present invention should be or are in any single embodiment of the invention. Rather, language referring to the features and advantages is understood to mean that a specific feature, advantage, or characteristic described in connection with an embodiment may be included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only generic embodiments of the invention and are not therefore to be considered to be limiting of its scope, the embodiments will be described and explained with additional specificity and detail through the use of the accompanying drawings, in which.

DETAILED DESCRIPTION OF THE INVENTION

Many of the functional units described in this specification are labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module also may be implemented in programmable hardware devices such as field programmable gate arrays, programmable array logic, programmable logic devices or the like.

Modules may also be implemented in software for execution by various types of processors. An identified module of executable code, for instance, may comprise one or more physical or logical blocks of computer instructions which, for instance, may be organized as an object, procedure, or function. Nevertheless, the executables of an identified module need not be physically located together, but may comprise disparate instructions stored in different locations which, when joined logically together, comprise the module and perform the stated operations for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set or may be distributed over different locations, including over different storage devices, and may exist, at least partially, merely as electronic signals on a system or network.

Figure 1:
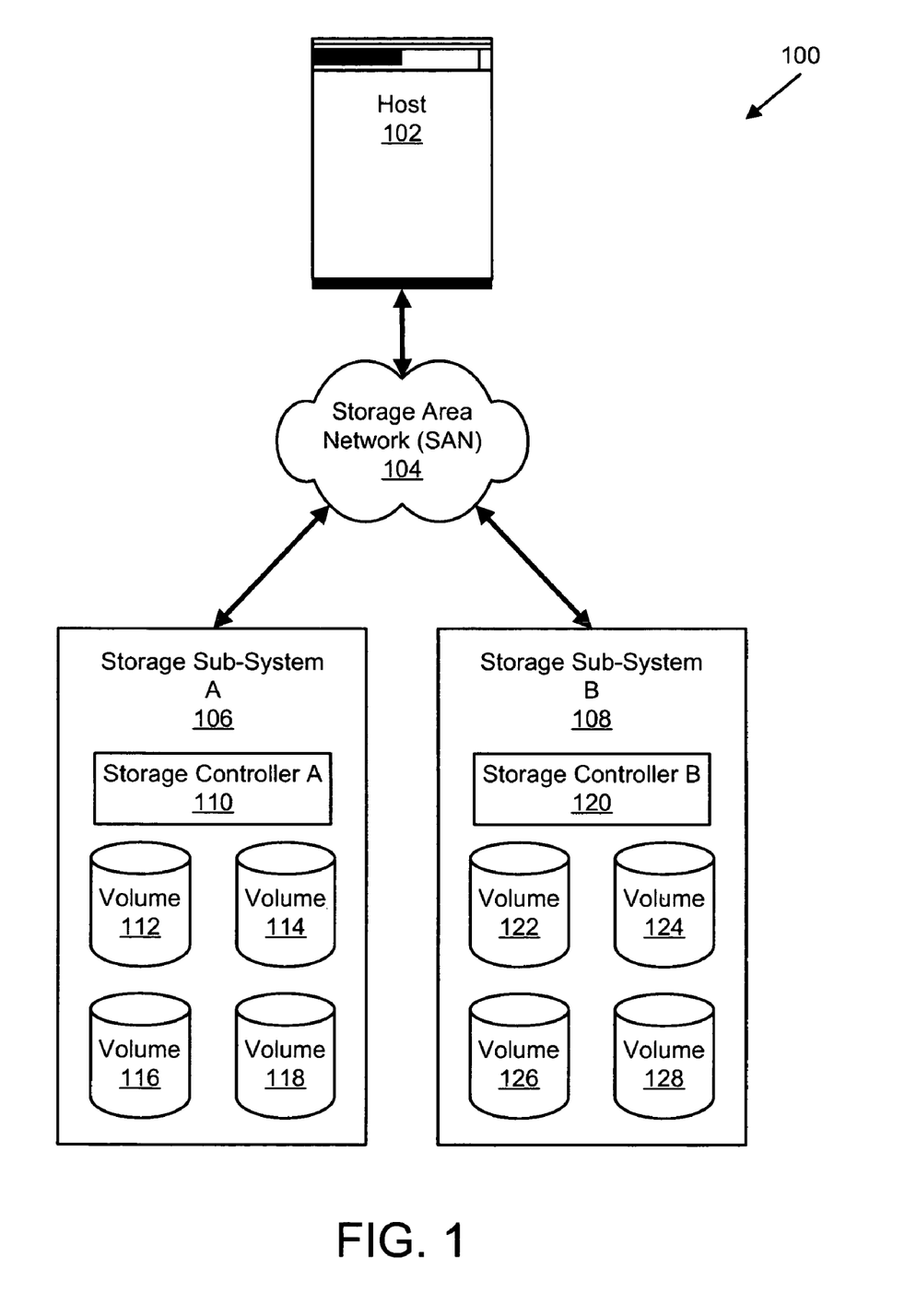
FIG. 1 is a schematic block diagram illustrating one embodiment of a storage area network (SAN) system.

FIG. 1 depicts one embodiment of a storage area network (SAN) system 100. The illustrated SAN system 100 includes a host 102 connected to a SAN 104. The SAN system 100 also includes a storage sub-system A 106 and a storage sub-system B 108. In one embodiment, the host 102 may communicate with the storage sub-system A 106 and/or the storage sub-system B 108 via the SAN 104. Similarly, the storage sub-system A 106 may communicate with the storage sub-system B 108 via the SAN 104. Alternatively, the storage sub-system A 106 may communicate directly with the storage sub-system B 108 via a direct communication channel (not shown).

In further embodiments, the SAN system 100 may include more than one host 102 and/or more than two storage sub-systems 106, 108. Where more than one host 102 is connected to the SAN 104, each host 102 may correspond to one or more of the storage sub-systems 106, 108. For example, in one embodiment, the host 102 may be configured to communicate only with the storage sub-system A 106, but not with the storage sub-system B 108.

The storage sub-system A 106, in one embodiment, includes a storage controller A 110 and a plurality of volumes 112-118. An example of the storage controller A 110 is described in more detail with reference to FIG. 2. The volumes 112-118 may represent physical storage devices, such as hard disk drives (HDDs), within the storage sub-system A 106. Alternatively, the volumes 112-118 may represent logical volumes that are mapped to certain physical storage devices within the storage sub-system A 106. The storage sub-system B 108 is similar to the storage sub-system A 106 in that it includes a storage controller B 120 and a plurality of volumes 122-128. The storage controller B 120 and the volumes 122-128 of the storage sub-system B 108 may be substantially similar to the storage controller A 110 and the volumes 112-118 of the storage sub-system A 106.

Figure 2:
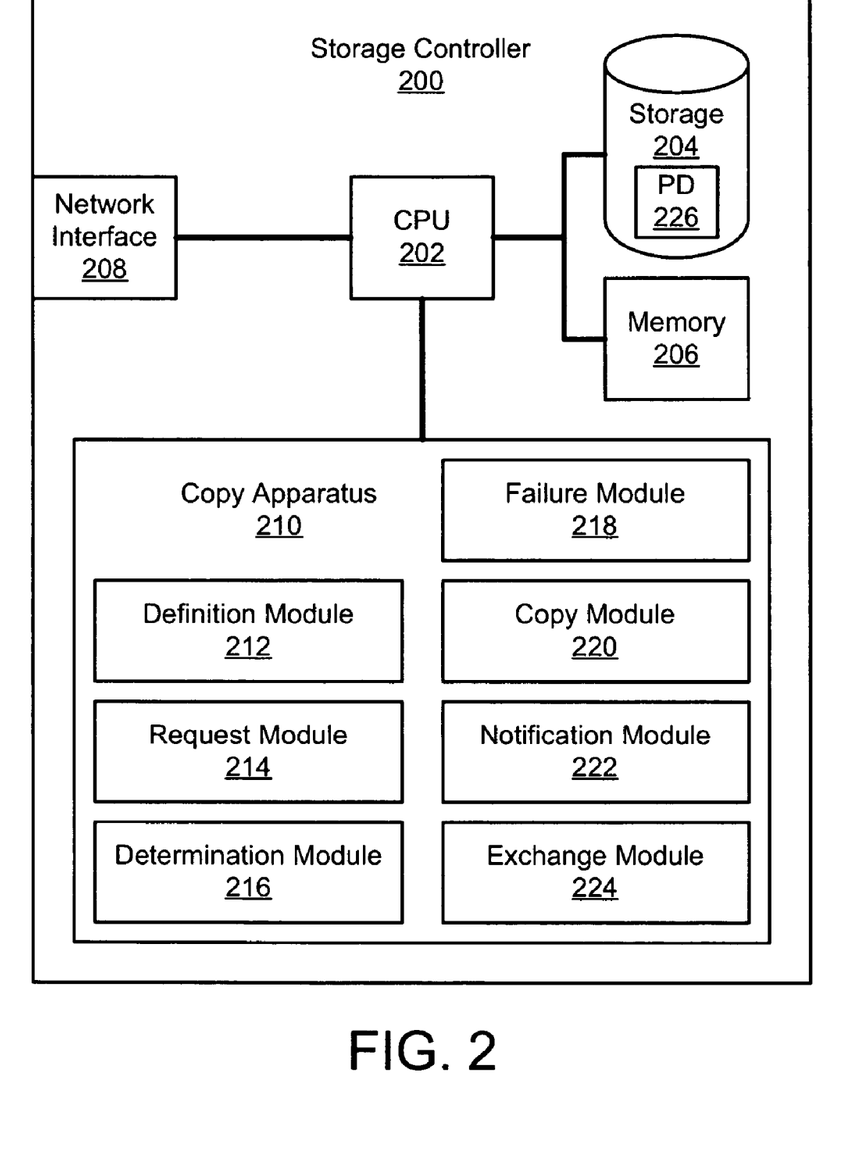
FIG. 2 is a schematic block diagram illustrating one embodiment of a storage controller within a storage sub-system of the SAN system.

FIG. 2 depicts one embodiment of a storage controller 200 that is substantially similar to the storage controller A 110 and the storage controller B 120 of FIG. 1. The illustrated storage controller 200 includes a central processing unit (CPU) 202, an electronic storage device 204, an electronic memory device 206, a network interface device 208, and a copy apparatus 210.

In one embodiment, the CPU 202 is configured to process data requests, operations, and commands to manage the storage controller 200. The electronic storage device 204 is configured, in one embodiment, to electronically store data that is related to the management and operation of the storage controller 200. In one embodiment, the electronic storage device 204 may be persistent memory or another type of persistent data storage. Similarly, the electronic memory device 206 is configured, in one embodiment, to electronically store data that may be used for management and operation of the storage controller 200 and/or application programs that may be executed on the storage controller 200. The network interface device 208 allows communications to occur between the storage controller 200 and other devices connected to the SAN 104. Alternatively, the network interface device 208 may allow communications between, for example, the storage controller A 110 and the storage controller B 120.

The copy apparatus 210 is configured, in one embodiment, to manage a copy operation associated with the storage sub-system on which the storage controller 200 is located. The illustrated copy apparatus 210 includes a definition module 212, a request module 214, and a determination module 216. The illustrated copy apparatus 210 also includes a failure module 218, a copy module 220, a notification module 222, and an exchange module 224. Although some description of these modules is provided immediately below, further details of the functionality of these modules also may be understood with reference to description of the flow charts that follow in FIGS. 5 through 8.

The definition module 212, in one embodiment, is configured to define a protection definition 226 for a plurality of electronic storage devices of a storage sub-system. For example, the definition module 212 may define a protection definition 226 for the volumes 112-118 on storage sub-system A 106. The protection definition 226 may be stored on the electronic storage device 204 within the storage controller 204 and/or may be stored on the electronic memory device 206. Alternatively, the protection definition 226 or copies thereof may be stored remotely on other machines within the SAN system 100. Examples of the protection definition 226 are provided and described in greater detail with reference to FIGS. 3 and 4.

In one embodiment, the definition module 212 may be invoked by a set of users or user applications (not shown) as part of configuration of the storage controller 200. Furthermore, access to the definition module 212 may be limited to certain specified users who have authority to create or alter the protection definition 226. As such, the protection definition 226 may be generally inaccessible to attached hosts 102 or other storage controllers. One exemplary implementation may provide the storage controller 200 with a mechanism for a user or user application to authenticate itself as an authorized user, at which point it will receive access to the definition module 212. For example, the storage controller 200 may include a configuration interface that allows an administrator to define users that have authority to access the definition module 212 and all users requesting access to the definition module 212 must authenticate themselves through the interface via a secure method such as password or other security feature.

The request module 214, in one embodiment, is configured to receive a copy request from a remote storage sub-system. For example, if the storage controller 200 is located on the storage sub-system A 106, then the request module 214 may receive a copy request from the storage sub-system B 108. In one embodiment, the copy request may identify a destination volume or device onto which the requesting storage sub-system B 108 is attempting to copy data. Reference to a destination device or destination volume herein is understood to refer generically to either a physical storage device or a logical data structure, depending only on the specific implementation within the SAN system 100. In a further embodiment, the copy request may originate from the host 102 coupled to the storage sub-system B 108 via the SAN 104.

The determination module 216, in one embodiment, is configured to determine a copy protection status of the destination device. The copy protection status indicates whether or not the destination device is either copy protected or write enabled. The copy protection status of the destination device may be defined in the protection definition 226. In one embodiment, this determination occurs locally at the storage sub-system corresponding to the storage controller 200.

The failure module 218, in one embodiment, is configured to fail the copy request in response to a determination that the copy protection status of the destination device is copy protected. Similarly, the copy module 220, in one embodiment, is configured to process the copy request in response to a determination that the copy protection status of the destination device is not copy protected or, in other words, write enabled. As described above, the copy protection status of the destination device may be indicated by the protection definition 226.

The notification module 222, in one embodiment, is configured to notify the requesting storage sub-system of the copy protection status of the destination device. For example, if the storage sub-system A 106 sends a copy request to the storage sub-system B 108 indicating one of the volumes 122-128 as a destination device, then a notification module 222 on the storage controller B 120 may notify the storage sub-system A 106 of the copy protection status of the requested destination device. Furthermore, the notification module 222 also may notify the storage sub-system A 106 of the status of the copy request and any related copy operations.

The exchange module 224, in one embodiment, modifies the protection definition 226 in response to an event. For example, the exchange module 224 may replace the protection definition 226 with an alternative protection definition in response to a recovery event. In a further embodiment, multiple protection definitions 226 may be available to a single storage controller 200 and individually referenced at different times, depending on the status of the storage controller 200 or the corresponding storage sub-system.

In certain embodiments, it may be difficult to know all of the events that might trigger a change or to define mechanisms for the user to define which changes cause which exchanges to occur. In fact, the storage controller 200 may be unaware of the occurrence of a particular event (e.g. a disaster at a remote site). In this case, a user or user application may invoke the exchange module 224. The user may do this as a result of an event, such as a disaster, or may do so just to handle a change in the operational mode of the storage system 100. For example, a set of volumes 122-128 used to keep backup copies of active volumes 112-118 may require different protections during different times of operation. In particular, the target volumes 122-128 may be available to copy to during a backup operation and are, therefore, unprotected. However, the backup copies 122-128 may be protected from accidental overwrite at other times during the day. In this scenario, a user may change the protection definition 226 to accommodate the different temporal protection needs.

By storing the protection definition 226 locally on the storage sub-system, an advantage may be obtained in minimizing the complexity of the protection definition 226 compared to a comprehensive protection definition for the entire SAN system 100. Additionally, maintaining a local protection definition 226 at each storage sub-system may preclude the need to synchronize a comprehensive protection definition with all of the storage sub-systems and volumes within a SAN system 100.

Figure 3:
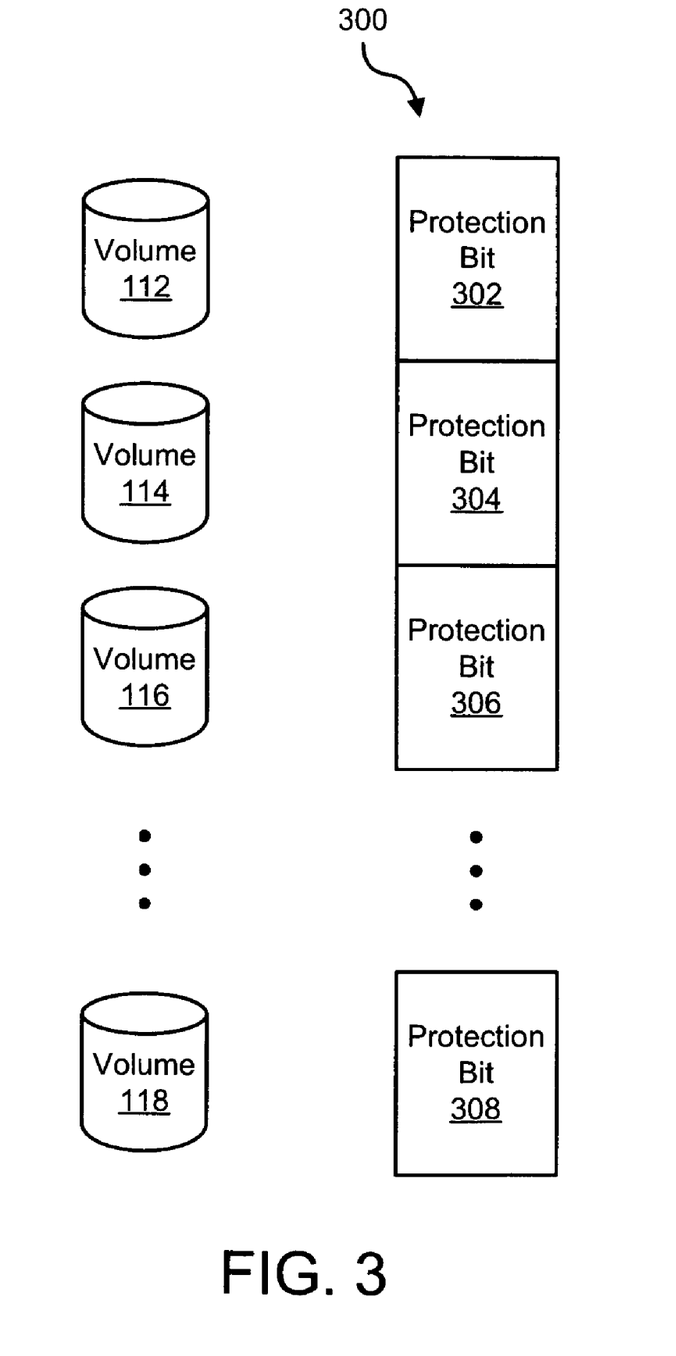
FIG. 3 is a schematic block diagram illustrating one embodiment of a protection definition that may be used to facilitate copy protection.

FIG. 3 depicts one embodiment of a protection definition 300 that maybe employed to facilitate copy protection. In certain embodiments, the protection definition 300 may include one protection status indicator corresponding to each volume within the storage sub-system. In one embodiment, the copy protection status indicator for each volume maybe a single bit, which may be referred to as a protection bit. For example, each of the volumes 112-118 within the storage sub-system A 106 may have a corresponding protection bit 302-308 within the protection definition 300 associated with the storage sub-system A 106.

The status of the protection bit 302 indicates whether or not data may be written or copied to the corresponding volume 112. In one embodiment, the volume 112 may be copy protected if the protection bit 302 is set to zero (or cleared). By using zero to indicate a copy protected status, the default status for each volume 112-118 may be copy protected. Similarly, the volume 112 may be write enabled when the protection bit 302 is set to one. Alternatively, the volume 112 may be write protected when the protection bit 302 is set to one and write enabled when the protection bit 302 is set to zero. In certain embodiments, none, some, or all of the protection bits 302-308 within the protection definition 300 may be set to indicate that the respective volumes are write protected.

For example, if the volume 112 is requested as a destination device in a copy operation, the protection bit 302 may indicate whether or not such copy operation may occur. The protection bit 302 may be defined to prohibit all copy operations to the volume 112 when the volume 112 is copy protected. Alternatively, the protection bit 302 maybe defined to allow one or more copy operations to the volume 112 when the volume 112 is copy enabled. When using a one dimensional (e.g. binary) protection definition 300, as shown in FIG. 3, it may be unnecessary to identify which protection bit 302-308 corresponds to each volume 112-118. Rather, the order of the protection bits 302-308 within the protection definition 300 may correspond to a known order of the volumes 112-118 within the storage sub-system A 106.

Figure 4:
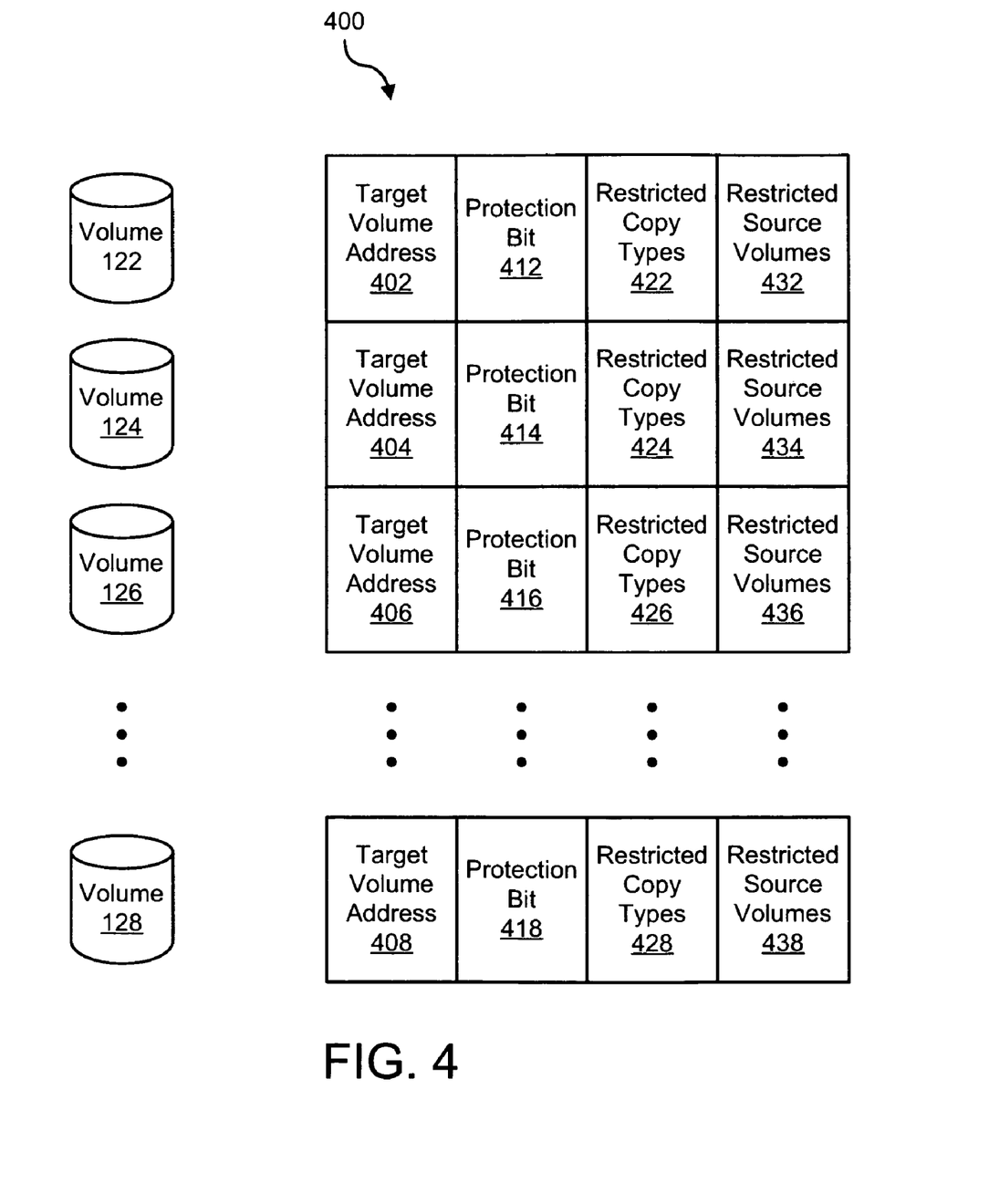
FIG. 4 is a schematic block diagram illustrating an alternative embodiment of a protection definition that may be used to facilitate copy protection.

FIG. 4 depicts an alternative embodiment of a protection definition 400 that may be employed to facilitate copy protection. Each row within the protection definition 400 corresponds to a single volume and may include multiple fields for various types of indicators. For example, a row corresponding to the volume 122 may include a target volume address 402, a protection bit 412, a restricted copy types indicator 422, and a restricted source volumes indicator 432. In one embodiment, the protection bit 412 is substantially similar to the protection bit 302 of FIG. 3. In a further embodiment, the alternative protection definition 400 may include one or more extent ranges (i.e. subsets of a volume) that may be protected.

The target volume address 402 may indicate the target volume, such as volume 122, with which the protection bit 412 is associated. The restricted copy types indicator 422 may indicate certain types of copy operations that are not allowed to the destination device associated with the target volume address 402. Similarly, the restricted source volumes indicator 432 may indicate specific source volumes or devices that are not allowed to copy data to the destination device associated with the target volume address 402. In further embodiments, the protection definition 400 may include fewer or more data fields in order to accurately and/or beneficially facilitate copy protection of the indicated target volumes. For example, the protection definition 400 may include a set of values to indicate restricted storage sub-systems that are not allowed to request copy operations involving the corresponding target volumes.

Furthermore, the protection definition 400 may be implemented using other formats and/or content. Although the protection definitions 226, 300, 400 described herein are stored locally on each storage sub-system in a distributed manner throughout the SAN system 100, one or more protection definitions 226, 300, 400 maybe combined and stored on a central machine or shared among a plurality of storage sub-systems.

Figure 5:
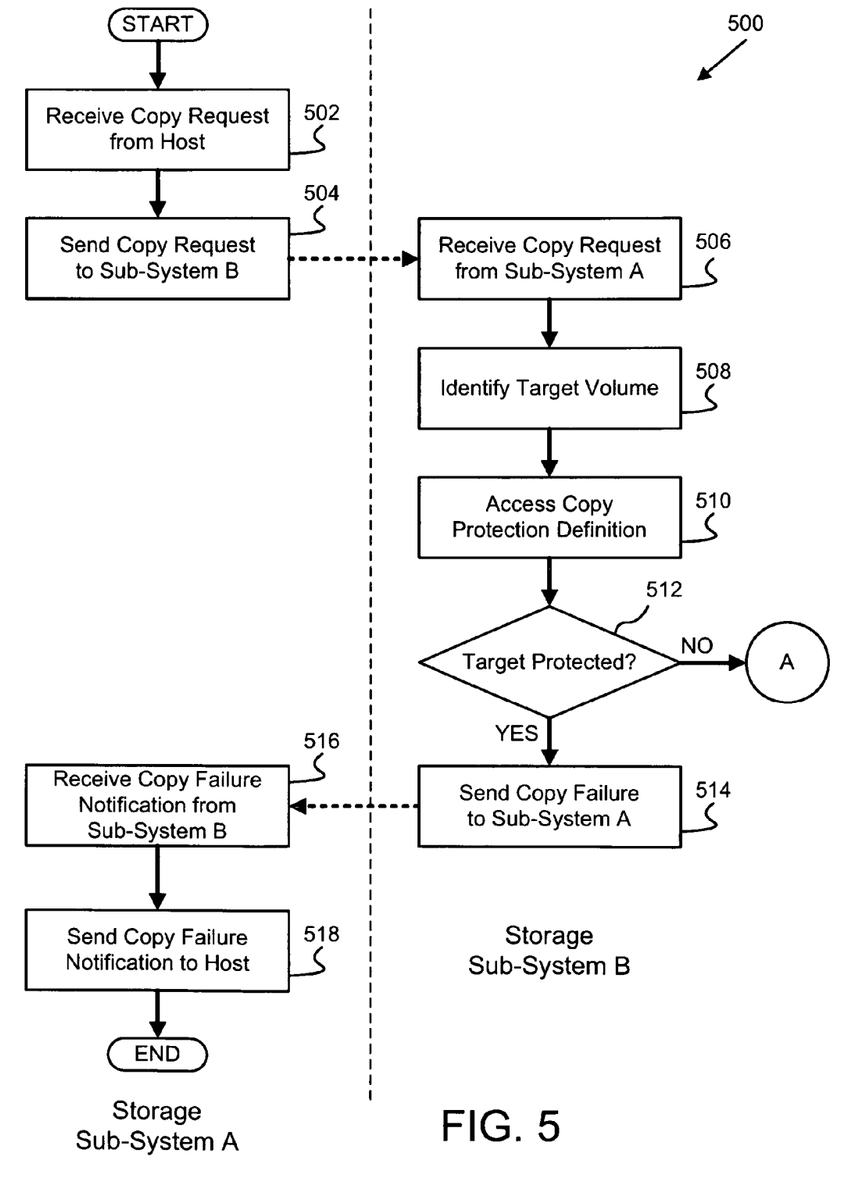
FIGS. 5 and 6 are a schematic flow chart diagram illustrating one embodiment of a protection method that may be implemented on the SAN system.
Figure 6:
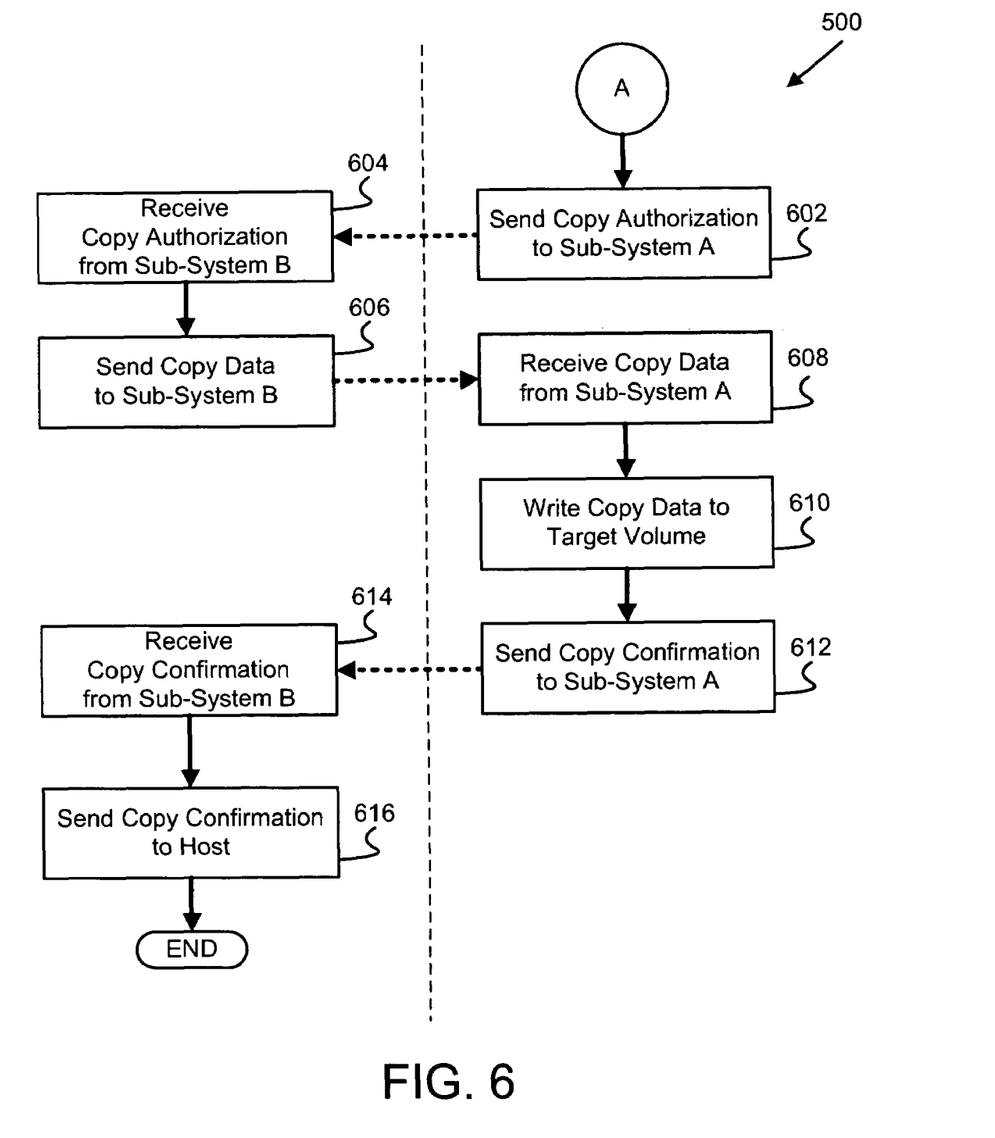

FIGS. 5 and 6 depict one embodiment of a protection method 500 that may be implemented on the SAN system 100 of FIG. 1. In particular, the protection method 500 is described with reference to the storage sub-system A 106 and the storage sub-system B 108 of FIG. 1. The illustrated protection method 500 begins when the storage sub-system A 106 receives 502 a copy request from the host 102. In one embodiment, the copy request indicates a source volume 112 on the storage sub-system A 106 and a target volume 122 on the storage sub-system B 108. The copy request is intended to result in a copy operation in which data is copied from the source volume 112 to the destination volume 122.

The storage sub-system A 106 subsequently sends 504 the copy request, or a modified version thereof, to the storage sub-system B 108. The storage sub-system B 108 receives 506 the copy request and identifies 508 the target volume 122 designated by the copy request. For instance, the copy request may identify the volume 122 as the destination volume for the copy operation. In one embodiment, the storage sub-system B 108 may employ the request module 214 to receive 506 the copy request from the storage sub-system A 106.

The storage controller B 120 then accesses 510 the protection definition 226 to determine 512 if the target volume 122 is copy protected or write enabled. In one embodiment, the storage controller B 120 may employ the determination module 216 to access the protection definition 226. In one embodiment, the protection definition 226 may be stored in the electronic storage device 204 and/or the electronic memory device 206. Alternatively, the protection definition 226 or a copy thereof may be stored in another device that is accessible to the determination module 216.

As described above, the protection definition 226 may include a copy protection status indicator, such as a protection bit 302, to indicate whether or not the target volume 122 is either copy protected or write enabled. If the target volume 122 is copy protected, then the storage sub-system B 108 sends 514 a failure notification to the storage sub-system A 106. In one embodiment, the storage sub-system B 108 may invoke the failure module 218 to fail the copy request and the notification module 222 to send 514 the failure notification to the storage sub-system A 106. Upon receiving 516 the failure notification from the storage sub-system B 108, the storage sub-system A 106 may notify 518 the requesting host 102 of the copy failure. The illustrated protection method 500 then ends.

Alternatively, if the target volume 122 is not copy protected, as determined 512 by the determination module 216, then the protection method 500 proceeds with the operations depicted in FIG. 6. In particular, the storage sub-system B 108 may send 602 a copy authorization to the storage sub-system A 106. In one embodiment, the storage sub-system B 108 may employ the copy module 220 to send 602 the copy authorization. The storage sub-system A 106 then receives 604 the copy authorization and, in turn, sends 606 the copy data to the storage sub-system B 108. The storage sub-system B 108 receives 608 the copy data and writes 610 the copy data to the designated device or volume 122. In one embodiment, the write operation 610 may be performed according to the type of copy technology that is employed. The storage sub-system B 108 may employ the copy module 220 to write 610 the copy data to the target volume 122.

After the copy data is written 610 to the target volume 122, the storage sub-system B 108 may send 612 a copy confirmation to the storage sub-system A 106 to indicate that the copy operation is successful. Upon receiving 614 the copy confirmation from the storage sub-system B 108, the storage sub-system A 106 may notify 616 the requesting host 102 of the successful completion of the copy operation. The illustrated protection method 500 then ends.

Although the foregoing example is discussed with specific reference to the storage sub-system A 106 and the storage sub-system B 108, it is understood that any subsystem may contain both source and target volumes at the same time. For example the storage sub-system A 106 might copy certain volumes 112, 114 to specific volumes 122, 124 on the storage sub-system B 108 while the storage sub-system B 108 concurrently copies certain volumes 126, 128 to specific volumes 116, 118 on the storage sub-system A 106. In this scenario, both of the storage sub-systems 106, 108 may have their own protection definitions 226 and apply that protection definition 226 to the respective volumes 116, 118 and 122, 124 that are independently designated as targets volumes.

Figure 7:
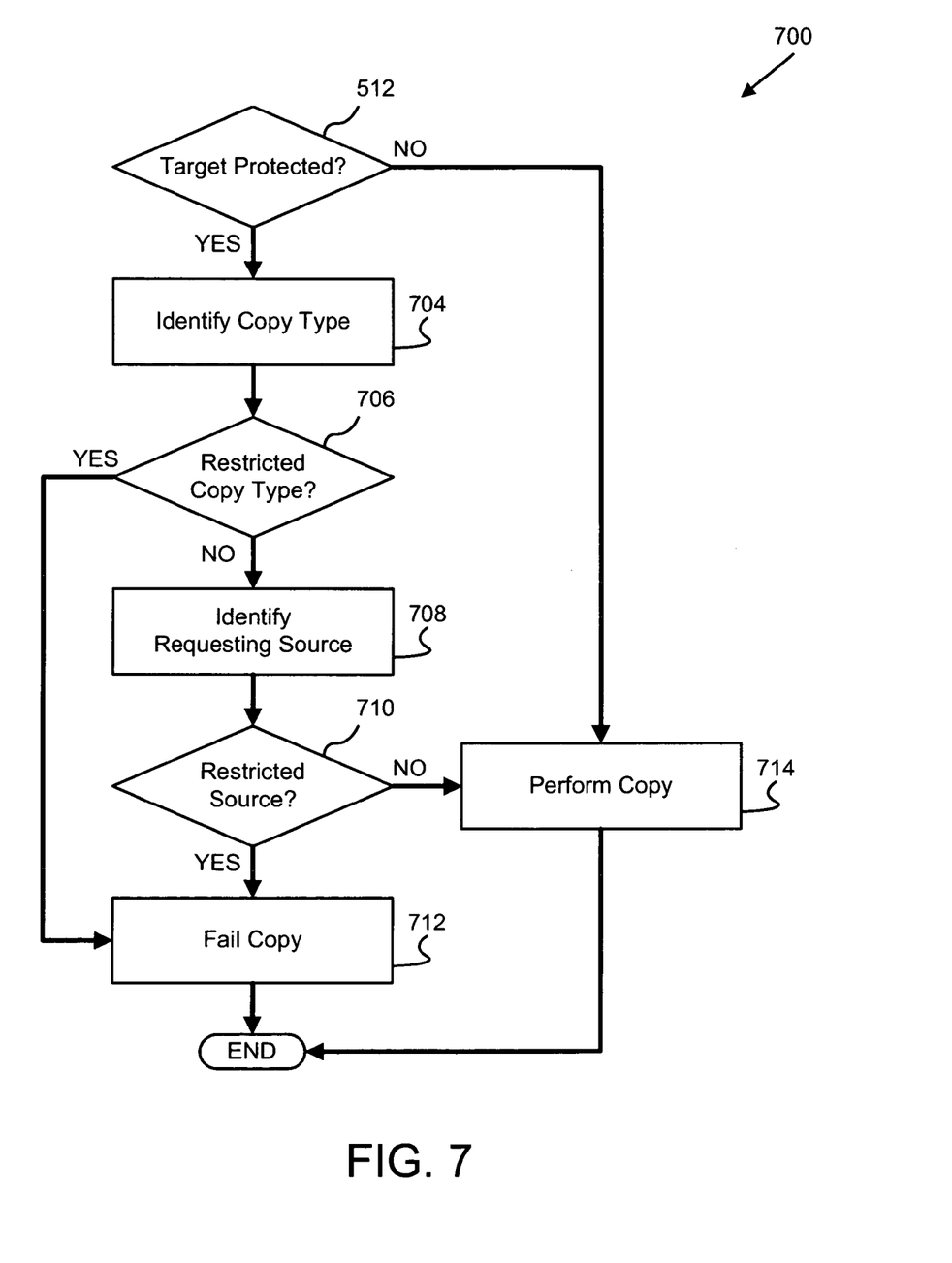
FIG. 7 is a schematic flow chart diagram illustrating an alternative embodiment of the protection method using another protection definition.

FIG. 7 depicts an alternative embodiment 700 of the protection method 500 of FIGS. 5 and 6 using the alternative protection definition 400 of FIG. 4. In particular, the alternative embodiment 700 includes additional operations that may be executed in response to a determination 512 that the target volume 122 is copy protected. For example, the storage sub-system B 108 may identify 704 a copy type if it is indicated in the copy request. The copy type refers to the copy technology, such as point-in-time, synchronous continuous, asynchronous continuous, and so forth, that may be used to execute the copy operations. The storage controller B 120 then determines 706 if the copy type is restricted. In one embodiment, the restricted copy types may be identified in a restricted copy type indicator field 422 of the protection definition 226 or an alternative protection definition 400. In other words, the storage controller B 120 may determine 706 whether or not the specific copy technology may be used to perform the copy operations.

If the copy type is not restricted, then the storage controller B 120 may identify 708 the source volume or device 112 of the storage sub-system A 106 and determine 710 if the source volume 112 is a restricted source, as may be indicated by the restricted source volumes indicator 432 in the protection definition 400. If either the copy type or the source volume 112 is restricted, then the storage controller B 120 may fail 712 the copy request, as described above with respect to the protection method 500. Alternatively, if the target volume is not protected, then the storage controller B 120 may process 714 the copy request and execute the necessary copy operations, as described above. Additionally, the storage controller B 120 may process 714 the copy request if neither the copy type nor the source volume 112 is restricted. After either failing 712 or processing 714 the copy request, the alternative embodiment 700 of the protection method 500 then ends.

Figure 8:
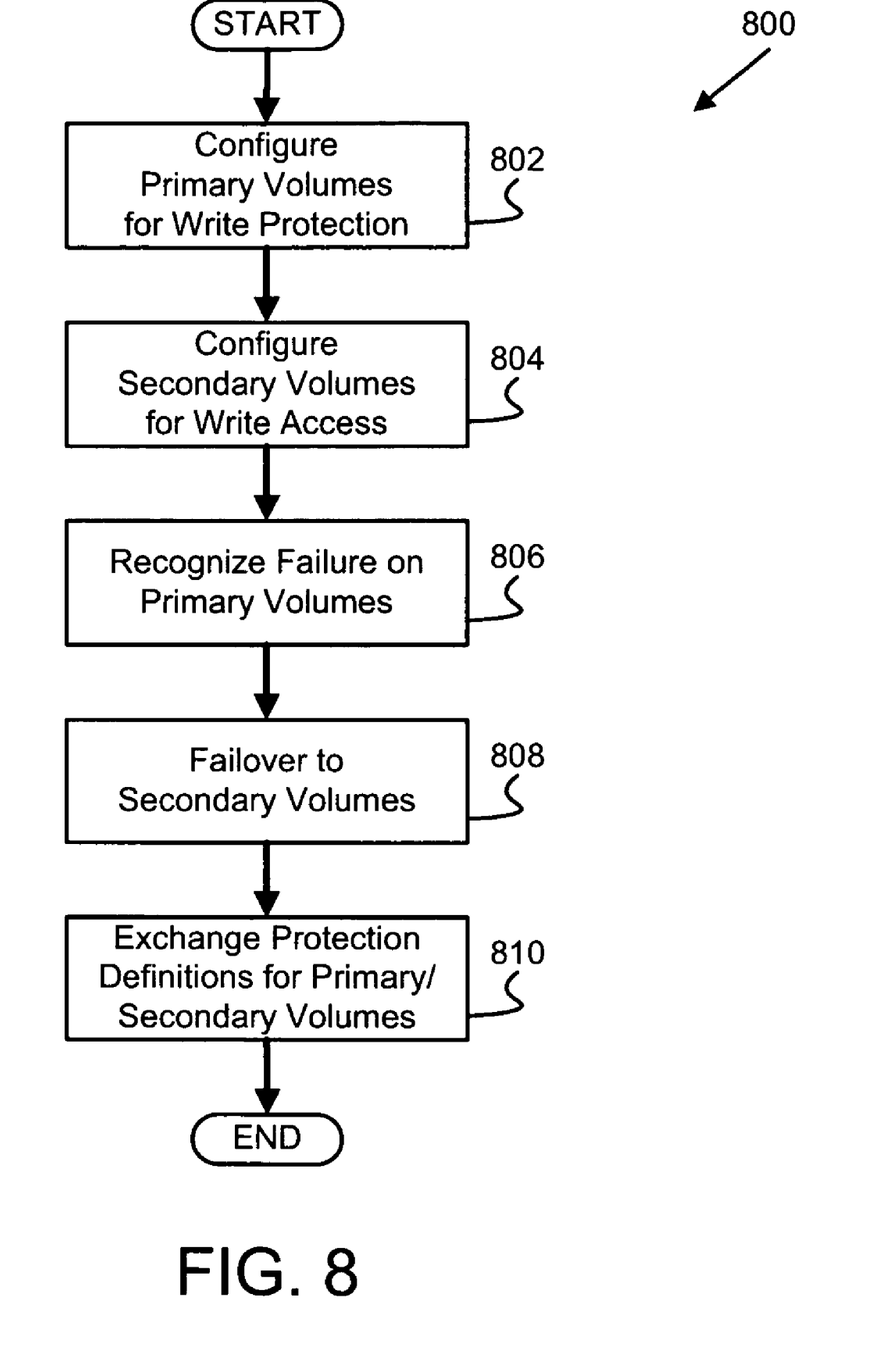
FIG. 8 is a schematic flow chart diagram illustrating one embodiment of a failover method that may be implemented on the SAN system.

FIG. 8 depicts one embodiment of a failover method 800 that may be implemented on the SAN system 100 of FIG. 1. Certain embodiments of the failover method 800 advantageously allow multiple protection definitions 226 to be defined. Further embodiments of the failover method 800 also allow the multiple protection definitions 226 to be dynamically assigned to a given set of volumes at different points in time. These advantages may be particularly beneficial in the case of a disaster recovery event, as described herein.

The illustrated failover method 800 begins by configuring 802 a first protection definition 226 so that a set of primary volumes, such as the volumes 112-118 of the storage sub-system A 106, may be write enabled. Similarly, a second protection definition 226 may be configured 804 so that a set of secondary volumes, such as the volumes 122-128 of the storage sub-system B 108, may be copy protected.

At some point during operation, the storage controller A 106, for example, may recognize 806 a failure on the primary volumes 112-118, requiring the SAN system 100 to failover 808 to the secondary volumes 122-128. For example, the secondary volumes 122-128 may be a backup of the primary volumes 112-118. By failing over 808 to the secondary volumes 122-128, the backup volumes may become the primary volumes and the primary volumes 112-128 may become the backup volumes. In order to maintain proper protection rights for the different sets of volumes, the SAN system 100 may exchange 810 the protection definitions 226 for the primary volumes 112-118 and the secondary volumes 122-128. For example, the primary volumes 112-118 of storage sub-system A 106 may be changed to be copy protected and the secondary volumes 122-128 of storage sub-system B 108 may be changed to be write enabled. The depicted failover method 800 then ends.

As stated above, the described embodiments are substantially more efficient and less cumbersome than trying to tell all the subsystems within a storage system 100 which target volumes are or are not available for write operations. For instance, for basic protection mechanism to manage protection for N volumes on the storage subsystem A 106 with the invention may require N bits. In comparison, a conventional implementation may configure all other storage sub-systems to protect/not protect the storage sub-system A's N volumes. At a minimum, this conventional implementation probably requires approximately 16 bytes to identify storage sub-system A and N bits for the volumes 112-118 on the storage sub-system A. In the general case of M sub-systems, every sub-system would need a M×N table of bits plus M system identifiers. In other words, the conventional system would require around M* M*(16*8+N) bits, compared to N bits for the embodiments presented herein. The conventional systems may be even more complex considering that different storage sub-systems may have different numbers of volumes. Synchronization of the various tables would also present problems of performance and accuracy within a convention system.

The schematic flow chart diagrams included are generally set forth as logical flow chart diagrams. As such, the depicted order and labeled operations are indicative of one embodiment of the presented method. Other operations and methods may be conceived that are equivalent in function, logic, or effect to one or more operations, or portions thereof, of the illustrated method. Additionally, the format and symbols employed are provided to explain the logical operations of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated operations of the depicted method. Additionally, the order in which a particular method occurs may or may not strictly adhere to the order of the corresponding operations shown.

Reference throughout this specification to "one embodiment," "an embodiment," or similar language means that a particular feature, structure, or characteristic described in connection with the embodiment maybe included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, a digital-video disk, a magnetic tape, a Bernoulli drive, a magnetic disk, a punch card, flash memory, integrated circuits, or other digital processing apparatus memory devices.

Furthermore, the described features, structures, or characteristics of the various embodiments may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of several embodiments of the invention. One skilled in the relevant art will recognize, however, that various embodiments maybe practiced without one or more of the specific details, or with other methods, components, materials, and so forth. In other instances, well-known structures, materials, or operations are not shown or described in detail to avoid obscuring aspects of the several embodiments.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to facilitate copy protection within a storage area network system comprising a host and a plurality of storage sub-systems, the apparatus comprising:
   a definition module coupled to a first storage sub-system, the definition module configured to define a protection definition and an alternate protection definition for a plurality of electronic storage devices of the first storage sub-system, the protection definition and the alternate protection definition each comprising a copy protection status indicator, a target volume address, a restricted source volume indicator, and a restricted copy type indicator;
   a request module coupled to the first storage sub-system, the request module configured to receive a copy request from a second storage sub-system; and
   a determination module coupled to the first storage sub-system, the determination module configured to determine at the first storage sub-system a copy protection status of a destination device.

2. The apparatus of claim 1, further comprising a failure module coupled to the first storage sub-system, the failure module configured to fail the copy request in response to a determination that the copy protection status of the destination device is copy protected.

3. The apparatus of claim 1, further comprising a copy module coupled to the first storage sub-system, the copy module configured to process the copy request in response to a determination that the copy protection status of the destination device is not copy protected.

4. The apparatus of claim 1, further comprising a notification module coupled to the first storage sub-system, the notification module configured to notify the second storage sub-system of the copy protection status of the destination device.

5. The apparatus of claim 1, further comprising an exchange module coupled to the first storage sub-system, the exchange module configured to modify the protection definition in response to an event.

6. The apparatus of claim 5, wherein the event is a disaster recovery event.

7. The apparatus of claim 1, wherein the protection definition is stored on the first storage sub-system.

8. The apparatus of claim 1, wherein the protection definition is stored on the host.

9. The apparatus of claim 1, wherein the copy protection status of the destination device is defined within the protection definition.

10. The apparatus of claim 1, wherein the copy request comprises a destination device identifier corresponding to the copy protection status of the destination device.

11. The apparatus of claim 1, wherein the destination device comprises one of the plurality of electronic storage devices of the first storage sub-system.

12. A system to facilitate copy protection within a storage area network system comprising a host and a plurality of storage sub-systems, the system comprising:
   a first storage sub-system having a first electronic storage device and a definition module coupled to the first storage sub-system, the definition module defining a protection definition and an alternate protection definition for the first electronic storage device, the protection definition and alternate protection definition each comprising a copy protection status indicator, a target volume address, a restricted source volume indicator, and a restricted copy type indicator;
   a second storage sub-system having a second electronic storage device, the second storage sub-system configured to send a copy request to the first storage sub-system, the copy request indicating the first electronic storage device as a destination device; and a copy apparatus coupled to the first storage sub-system, the copy apparatus configured to determine at the first storage sub-system a copy protection status of the destination device in response to the copy request.

13. The system of claim 12, wherein the copy apparatus is further configured to notify the second storage sub-system of the copy protection status of the destination device.

14. The system of claim 12, further comprising an electronic memory device coupled to the first storage sub-system, the electronic memory device configured to store a protection definition descriptive of the copy protection status of the destination device.

15. The system of claim 12, wherein the host is coupled to the second storage sub-system, the host configured to issue the copy request to the second storage sub-system.

16. The system of claim 12, further comprising a storage area network (SAN) that couples the first storage sub-system to the second storage sub-system.

17. A signal bearing medium tangibly embodying a program of machine-readable instructions executable by a digital processing apparatus to perform operations to facilitate copy protection within a storage area network system comprising a host and a plurality of storage sub-systems, the operations comprising:

defining a protection definition and an alternate protection definition for a plurality of electronic storage devices of a first storage sub-system, the protection definition and the alternate protection definition each comprising a copy protection status indicator, a target volume address, a restricted source volume indicator, and a restricted copy type indicator;

receiving a copy request from a second storage sub-system; and determining at the first storage sub-system a copy protection status of a destination device, the copy protection status defined within the protection definition, the destination device comprising one of the plurality of electronic storage devices.

18. The signal bearing medium of claim 17, wherein the instructions further comprise an operation to fail the copy request in response to a determination that the copy protection status of the destination device is copy protected.

19. The signal bearing medium of claim 17, wherein the instructions further comprise an operation to process the copy request in response to a determination that the copy protection status of the destination device is not copy protected.

20. The signal bearing medium of claim 17, wherein the instructions further comprise an operation to notify the second storage sub-system of the copy protection status of the destination device.

21. The signal bearing medium of claim 17, wherein the instructions further comprise an operation to modify the protection definition in response to an event.

22. The signal bearing medium of claim 17, wherein the instructions further comprise an operation to define an alternative protection definition.

23. A method for facilitating copy protection within a storage area network system comprising a host and a plurality of storage sub-systems, the method comprising:

defining a protection definition and an alternate protection definition for a plurality of electronic storage devices of a first storage sub-system, the protection definition and the alternate protection definition each comprising a copy protection status indicator, a target volume address, a restricted source volume indicator, and a restricted copy type indicator;

receiving a copy request from a second storage sub-system; and determining at the first storage sub-system a copy protection status of a destination device, the copy protection status defined within the protection definition, the destination device comprising one of the plurality of electronic storage devices.

24. The method of claim 23, further comprising failing the copy request in response to a determination that the copy protection status of the destination device is copy protected.

25. The method of claim 23, further comprising processing the copy request in response to a determination that the copy protection status of the destination device is not copy protected.

26. The method of claim 23, further comprising notifying the second storage sub-system of the copy protection status of the destination device.

27. The method of claim 23, further comprising modifying the protection definition in response to an event.

28. The method of claim 23, further comprising defining an alternative protection definition.

29. A method for facilitating copy protection within a storage area network system comprising a host and a plurality of storage sub-systems, the method comprising:

defining a protection definition and an alternate protection definition for a plurality of electronic storage devices of a first storage sub-system; receiving a copy request from a second storage sub-system, the protection definition and the alternate protection definition each comprising a copy protection status indicator, a target volume address, a restricted source volume indicator, and a restricted copy type indicator;

determining at the first storage sub-system a copy protection status of a destination device, the destination device comprising one of the plurality of electronic storage devices;

responding to the copy request in response to a determination of the copy protection status of the destination device; and notifying the second storage sub-system of the copy protection status of the destination device.

30. An apparatus to facilitate copy protection within a storage area network system comprising a host and a plurality of storage sub-systems, the apparatus comprising:

means for defining a protection definition and an alternate protection definition for a plurality of electronic storage devices of a first storage sub-system, the protection definition and the alternate protection definition each comprising a copy protection status indicator, a target volume address, a restricted source volume indicator, and a restricted copy type indicator;

means for receiving a copy request from a second storage sub-system; and means for determining at the first storage sub-system a copy protection status of a destination device, the copy protection status defined within the protection definition, the destination device comprising one of the plurality of electronic storage devices.

* * * * *